B. S. NICKERSON.
SPRING MOTOR CONTROLLING MECHANISM.
APPLICATION FILED SEPT. 10, 1917. RENEWED JUNE 23, 1919.

1,384,272.

Patented July 12, 1921.

Inventor:
Bernard S. Nickerson
by [Attorneys signature]
Attorneys.

B. S. NICKERSON.
SPRING MOTOR CONTROLLING MECHANISM.
APPLICATION FILED SEPT. 10, 1917. RENEWED JUNE 23, 1919.

1,384,272.

Patented July 12, 1921.

B. S. NICKERSON.
SPRING MOTOR CONTROLLING MECHANISM.
APPLICATION FILED SEPT. 10, 1917. RENEWED JUNE 23, 1919.
1,384,272.
Patented July 12, 1921.
3 SHEETS—SHEET 3.
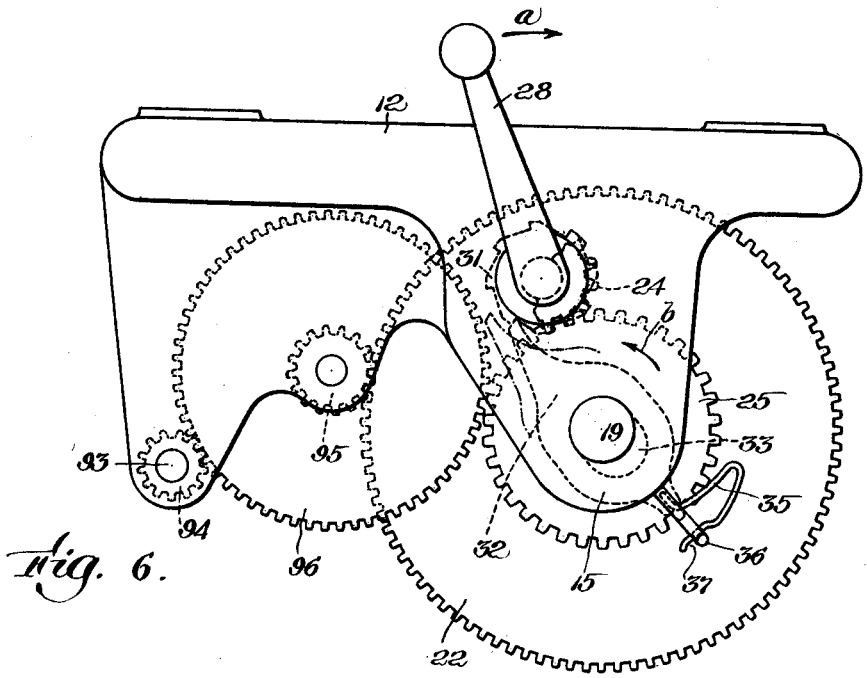
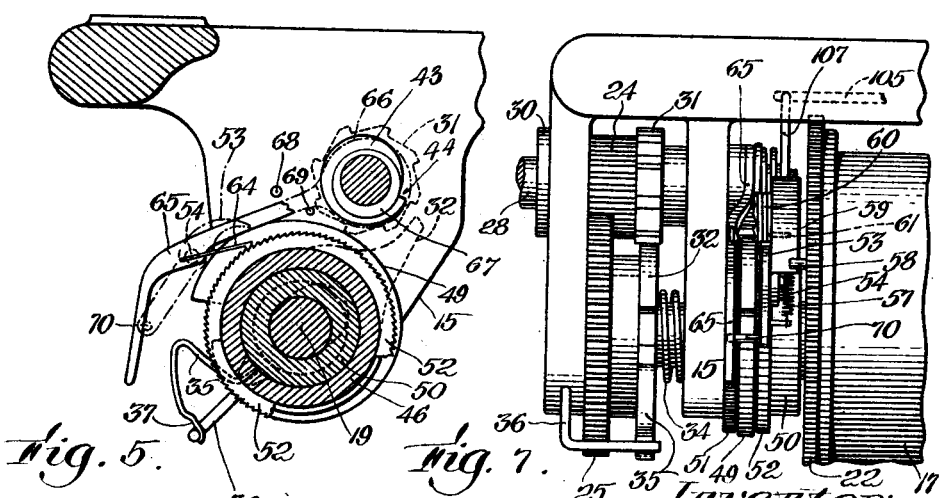

UNITED STATES PATENT OFFICE.

BERNARD S. NICKERSON, OF BOSTON, MASSACHUSETTS.

SPRING-MOTOR-CONTROLLING MECHANISM.

1,384,272. Specification of Letters Patent. Patented July 12, 1921.

Application filed September 10, 1917, Serial No. 190,458. Renewed June 23, 1919. Serial No. 306,206.

*To all whom it may concern:*

Be it known that I, BERNARD S. NICKERSON, a citizen of the Dominion of Canada, residing at Boston, in the county of Suffolk and State of Massachusetts, have invented new and useful Improvements in Spring-Motor-Controlling Mechanism, of which the following is a specification.

This invention has relation broadly to spring motors, wherein motive power for operating any desired mechanism is stored in a spring, such for instance as the motors that are utilized in the operation of the record in a sound-reproducing machine.

One of the objects of the invention is to provide a simple mechanism for preventing the over-winding of the spring; and another object of the invention is to provide an indicating mechanism for indicating the amount of the residual power that may be in the spring at any time between its wound and unwound condition.

I have exemplified the invention in a spring motor for sound-reproducing machines, but it will be understood that the invention is not limited in its application to such machine but is capable of use in connection with any spring motor which may be employed for a variety of uses.

As embodied in a machine for reproducing sound, the mechanism comprises a spring of which one end is attached to a gear for transmitting power to the turntable and the other end is attached to a rotary element by which power is stored in the spring. In such machines, and more especially those in which the power is stored in the spring by the manual operation of a rotatable element, such as a winding pinion, it is highly desirable to prevent the operator from over-winding the spring, since such over-winding distorts the spring and is liable to injure or break it. It is also desirable to provide some means whereby the operator may ascertain the power that remains stored in the spring before playing a record in order that it will not be necessary to rewind the spring during the playing of such record; and, in case it should happen that the spring has imparted the power stored therein before the completion of the operation of a record so as to require the rewinding of the spring, to hold the record or the driven shaft against rotation during such rewinding.

In accordance with my invention, I provide a mechanism comprising a movable indicator by which it is possible for the operator by a glance to ascertain the condition of the spring, that is, the amount of power stored therein. In addition, the invention comprises a simple mechanism which is automatic in operation and which prevents the spring from being stressed beyond a given point. The invention further comprises mechanism which is automatically actuated when the winding shaft is operated, to hold the driven shaft and the record against rotation during the winding of the spring.

The mechanism for preventing the over-winding of the spring comprises a device for rendering the winding pinion inoperative, and a cam under control of the spring-driven shaft for controlling the operation of said device. Said cam is mounted to rotate, and is moved in one direction when the spring is being wound and is moved in the opposite direction during the unwinding of the spring. This rotation of the cam, first in one direction and then in the other, is effected by pawl and ratchet mechanism, means being provided for automatically separating from its ratchet one or the other of the pawls as the case may be.

In the particular embodiment of the invention which I have illustrated and shall subsequently describe, I employ in connection with the said cam, an indicator, the movable element of which is controlled by the cam and which indicates visually the condition of the spring as to the amount of power stored therein. Since the invention is illustrated as being embodied in a sound-reproducing mechanism which is ordinarily provided with a governor shaft driven from the turn-table shaft, the mechanism for holding the said shafts from being actuated during the winding of the spring is arranged to operate upon or coact with said governor shaft or an element thereon.

In addition to the foregoing features, the invention also includes a silent ratchet mechanism for the winding pinion including a recoiling pawl for permitting a certain reverse rotation of the winding shaft and the automatic operation of the stopping mechanism for the driven shaft, and the automatic control of the pawl and ratchet mechanism by which the cam is operated.

On the accompanying drawings,—

Fig. 5 represents a section on the line 5—5 of Fig. 3.

Fig. 6 represents an end view of the mechanism, showing the silent ratchet clutch, including the recoiling pawl.

Fig. 7 represents a rear elevation of the mechanism illustrated in Fig. 1.

Figure 1:
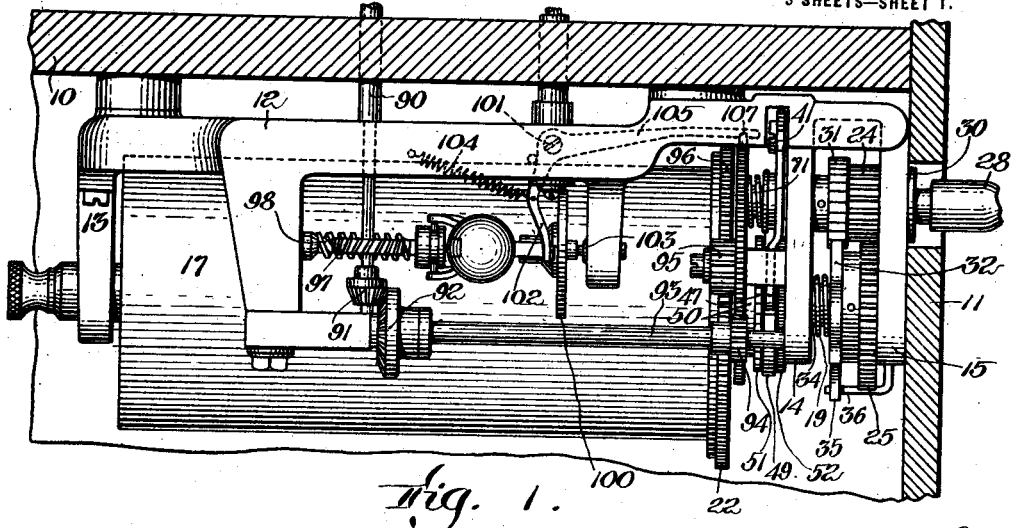
Figure 1 represents in vertical section the case of a sound-reproducing machine and illustrates in side elevation the motor and the various instrumentalities which embody the present invention.

On the drawings, the wooden frame which forms a part of the talking or sound-reproducing machine, includes the motor board 10 and a side wall 11. I have not attempted to illustrate the complete wooden frame of the instrument as it forms no part of the present invention. Attached to the under side of the motor board is the metallic motor-supporting frame which is indicated at 12 and which is provided at one end with the depending lug or bracket 13 and at the other end with the depending bracket 14. In parallelism with the bracket 14 at the same end of the metallic frame, there is a second bracket 15. These brackets serve as bearings for supporting certain of the instrumentalities which will be described.

Figure 3:
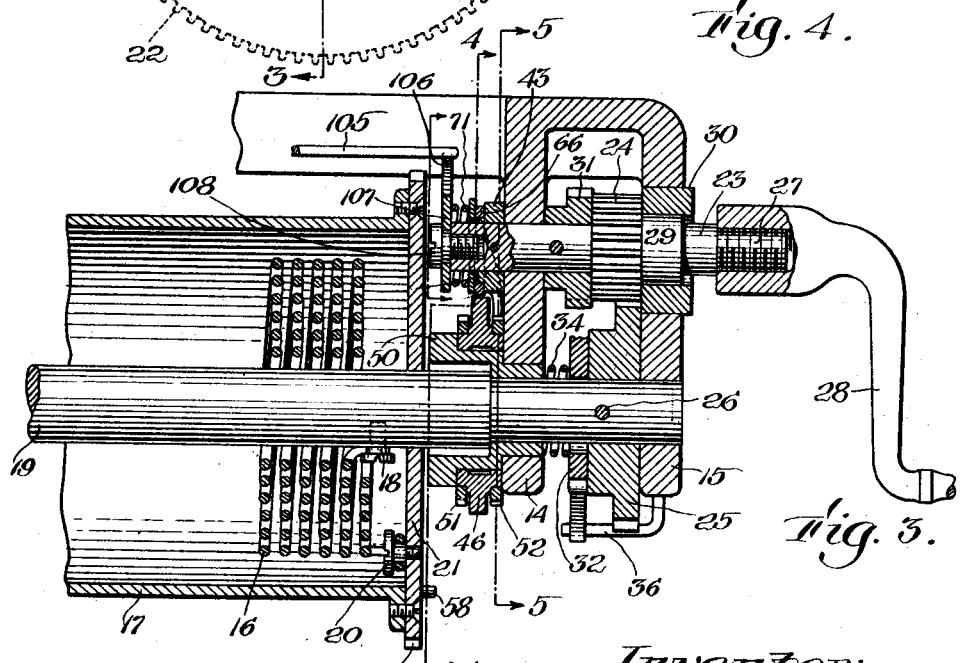
Fig. 3 represents a section through a portion of the mechanism, the plane of the section being indicated by the line 3—3 of Fig. 4.

The spring, in which power is stored, may be of any type suitable for the purpose. I have selected for illustration, however, a round wire spring 16 which is wound in a series of convolutions and which is incased within a spring barrel 17. One end of the spring is secured by a screw 18 to the spring-shaft 19, and the other end of the spring is secured by a screw 20 to the end wall 21 of the barrel. Power is stored in the spring by the rotation of the spring shaft 19, and power is imparted from the spring through the barrel, the end wall 21 of the barrel being provided with teeth 22 and constituting the driving gear interposed between the spring and the mechanism which it drives. The spring shaft 19 is journaled in the brackets 13 and 15, being projected beyond the ends of the barrel as clearly indicated in Figs. 2 and 3. For the purpose of rotating the spring shaft and storing power in the spring, I employ a winding shaft 23 which is journaled in the brackets 14 and 15, and which is provided with a winding pinion 24 intermeshing with and driving a gear 25, the hub of which is secured by a pin 26 to the end of the spring shaft 19. The winding shaft 23 is threaded at its end, as indicated at 27, for the reception of a manually-operated crank handle 28. The winding pinion 24 is conventionally formed integrally with the winding shaft 23, and the latter is provided with a peripheral flange portion 29 journaled in a sleeve 30 secured in the bracket 15. The provision of the sleeve or bushing 30, which is removable from the bracket 15, permits the axial removal of the winding shaft and the parts thereon which are located between the brackets 14 and 15. Assuming that the spring barrel is held against free rotation, it is obvious that, by rotating the crank handle 28 in the proper direction, the spring will be stressed through the rotation of the shaft 19 to which power is imparted from the winding shaft by the gears 24 and 25. After the spring is stressed, it is necessary to hold the winding shaft against rotation and this is accomplished by a pawl and ratchet mechanism which is best illustrated in Fig. 6. This mechanism includes a ratchet 31, the teeth of which have locking shoulders which are radial and which are engaged by a pawl indicated as a whole at 32. The hub of the pawl has an elongated slot 33 through which the end of the spring shaft 19 extends. This pawl is pressed against the face of the hub of the gear 25 by a spring 34, as best shown in Fig. 3, so that, when the gear 25 is rotated in one direction or the other, the pawl will be rocked frictionally in the corresponding direction about the shaft 19. The pawl is provided with the elongated slot 33 to permit it to recoil yieldingly after it is engaged with the ratchet 31 to permit a limited reverse rotation of the winding shaft for a purpose which I shall subsequently explain. This recoiling movement is approximately longitudinal of the pawl, and against the pressure of a spring 35. Said spring, which is substantially V-shaped, has one bent end inserted in a socket in the hub of the pawl and its other end bears against a stop which consists of a pin 36 secured to the bracket 15 and having a bent portion extending beyond the gear 25 for engagement with the spring. The end portion of the spring, which engages the pin or stop 36, is adapted to slide to a limited extent against the pin and is provided with a socket 37, formed by bending the extremity of the spring, to receive the pin when the pawl has been moved to the left-hand dotted position in Fig. 6. When the crank handle 28 is rotated in the direction of the arrow a in Fig. 6, thereby causing the spring shaft 19 and the gear 25 to be rotated in the direction of the arrow b in said figure, the frictional engagement of the gear with the pawl will move the pawl anti-clockwise out of engagement with the ratchet 31, whereupon the spring 35 will move the pawl lengthwise so that it will occupy the left-hand dotted position in the last-mentioned figure, where it is in complete disengagement from the ratchet, so that, during the continued rotation of the crank handle thereafter, the ratchet 31 will rotate freely and no sound will be produced. As soon as the rotation of the crank handle ceases, however, and it is released, the spring 16 rotates the parts in a reverse direction to a limited extent, and the consequent clockwise movement of the gear 25, by reason of its frictional engagement with the pawl, moves said pawl clockwise to bring its end into engagement with one of the teeth of the ratchet. The movement of the ratchet, however, continues after the engagement of the pawl with a tooth thereon and moves the pawl longitudinally against the stress of the spring 35 until the pawl has reached a position where the end wall of the slot 33 therein engages the spring shaft 19 and stops further reverse rotation of the pawl 31. The provision of a pawl which has a limited recoil to permit a reverse rotation of the winding shaft enables me to utilize that reverse rotation in controlling the operation of the pawls which form a part of the ratchet mechanism for effecting the rotation of the cam which controls those instrumentalities of my mechanism for preventing the over-winding of the spring. This reverse rotation of the winding shaft, which is permitted by the recoiling pawl, also enables me to utilize the reverse movement of the winding mechanism in moving to an inoperative or inactive position the stopping mechanism for the motor-driven shaft.

I have stated that one of the objects of the present invention is to render inoperative the winding mechanism when the spring has been stressed to a predetermined extent so as to prevent over-winding thereof. This is accomplished in the present embodiment of the invention by locking the winding shaft, although the spring shaft or one of the parts intervening between them could be locked if desired.

Figure 4:
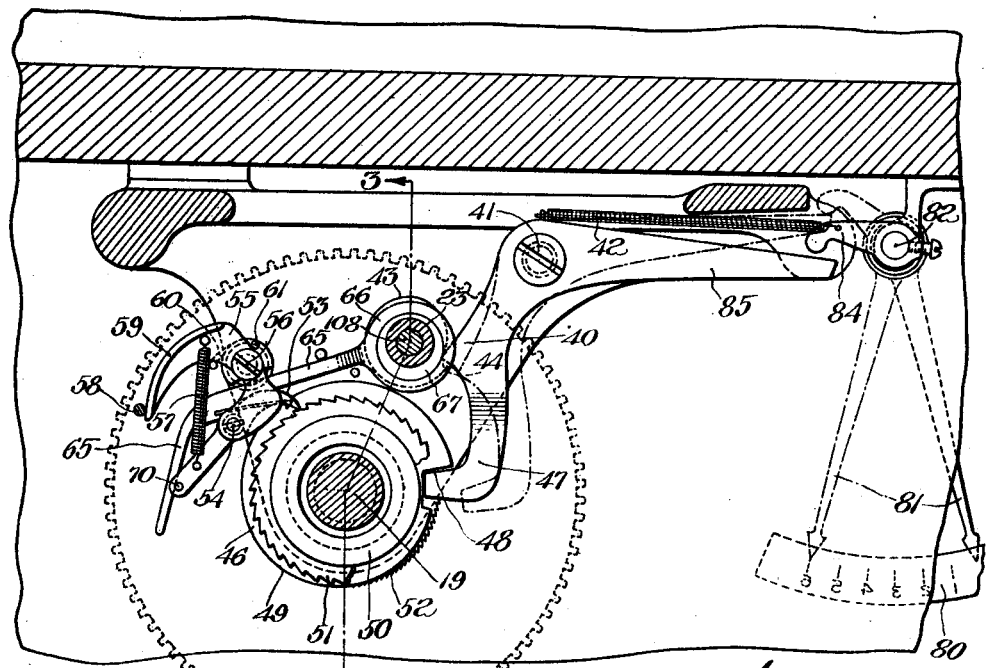
Fig. 4 represents a section on the line 4—4 of Fig. 3.

I shall now describe, however, a mechanism for positively locking the winding shaft and winding pinion against further rotation when the spring has been stressed to a predetermined extent. This locking mechanism includes a spring-tensioned latch adapted to coöperate with a stop mounted to rotate with the winding shaft. The latch is controlled in its operation by a rotatable cam. Coöperating with the cam are two oppositely toothed ratchets by which the cam is rotated first in one direction when the spring is being wound and is rotated in the other direction when the spring is unwound. When the spring has been wound to a predetermined extent, the cam permits the operation of the latch to stop the further winding of the spring, and, as soon as the spring begins to unwind, the latch is moved out of engagement with the lock on the winding shaft. The latch itself is indicated at 40, and it is pivoted upon a screw pin 41, as best shown in Fig. 4. A spring 42 tends to swing the latch clockwise about the pivot 41. The stop, with which the latch is adapted to engage, consists of a collar 43 pinned upon the winding shaft 23 and having a shoulder or abutment 44 with which the latch may be engaged. When permitted by the cam, to be described, to be moved clockwise by the spring 42 into engagement with the collar 43 during the winding of the spring, the engagement of the shoulder or stop 44 with the latch prevents further rotation of the winding pinion and further winding of the spring. The operation of this locking mechanism is controlled by a cam 46, against the periphery of which an arm or extension 47 of the latch engages. The controller or cam is provided with a peripheral recess 48, into which the end of the arm 47 may enter so as to permit the latch to be moved into potential working relation to the stop collar 43; but, when the end of the arm 47 is riding on the remainder of the periphery of the cam, the latch is held in an inactive position. For a purpose to be described, the cam face 49, with which the end of arm 47 engages, is approximately spiral. The hub of the cam 46 is mounted upon a stationary bushing 50 inserted in the bracket 14, and upon said hub of the cam there are rigidly secured the two oppositely toothed ratchets 51, 52. When the spring is being wound, the ratchet 52 is advanced with a step-by-step movement to move the cam 46 anti-clockwise, and, when the spring is unwinding, the ratchet 51 is actuated to move said cam clockwise. The ratchet 51 is provided with relatively large teeth and the ratchet 52 with relatively fine teeth. The ratchet 52 is advanced one tooth for each complete rotation of the winding shaft, and the ratchet 51 is advanced one step for each rotation of the spring barrel 17. The pawl, which coöperates with the ratchet 51, is indicated at 53, and it is connected by a pivot 54 with a two-armed lever 55 pivoted upon a screw pin 56 inserted in the bracket 14. The pawl 53 is pivoted upon one arm of said lever 55 and a spring 57 connects the tail of said pawl with the other arm of said lever so as to impel the operative end of said pawl yieldingly into engagement with the ratchet 51. The toothed end wall 21 of the spring barrel is provided with a pin 58, which, during each rotation of the spring barrel, engages the cam-shaped end of one of the arms of the lever 55, as indicated at 59, so as to rock said lever anti-clockwise and cause the pawl 53 to advance the ratchet 51 one step. After the pin 58 has passed the cam-shaped end 59 of the arm 55, said lever is returned to its initial position by a spring 60, one end of which is connected to the hub of said arm and the other to a stationary part of the machine. A small pin 61 limits the oscillatory movement of the two-armed lever 55 when impelled by the spring 60. When the spring is being wound, the ratchet 53 is moved to its inactive position by a mechanism which I shall subsequently explain.

For operating the ratchet 52 during the winding of the spring, I employ a pawl 64, as best shown in Fig. 5. This pawl consists of a spring strip having a hooked end and it is mounted in an arm 65 projecting from an eccentric strap 66 arranged on an eccentric 67 formed on the hub of the locking member 43 which has been previously described as being pinned to the winding shaft. When the winding shaft is rotated, the operation of the eccentric 67 causes a reciprocation of the arm 65, and, through the pawl 64, a step-by-step anti-clockwise rotation of the ratchet 52 and the cam 46. The reciprocation of the arm 65 is guided by two pins 68, 69, indicated in Fig. 5, said pins being spaced far enough apart to permit a limited oscillatory movement of the arm 65 in addition to its reciprocatory movement.

It is evident that, when one of the pawls is operating upon its ratchet, the other pawl must be disengaged from its associated ratchet. I accomplish this as follows. The end of the arm 65 is angular and is adapted to engage a pin or stud 70 formed on the tail of the pawl 53, so that a movement of the arm 65 anti-clockwise disengages the operative end of the pawl 53 from the ratchet 51. When the winding pinion is being operated, the arm 65 is moved anti-clockwise so as to disengage the pawl 53 from the ratchet 51. This is accomplished by frictionally engaging the eccentric strap with the face of the locking member 43 by a coiled spring 71, as shown in Fig. 1, which bears against the eccentric strap. Consequently, when the winding pinion is being rotated anti-clockwise, the arm 65 is moved frictionally in the same direction. When the winding ceases, however, and the winding pinion and the winding shaft are permitted by the recoil of the locking pawl 32, under stress of the motor spring, to rotate reversely, the arm 65 is moved clockwise so as to separate the pawl 64 from the ratchet 52 and to permit the pawl 53 to engage the ratchet 51. From the foregoing description, it will now be apparent that, when the winding shaft is being operated by the crank handle 28, the cam will be rotated anti-clockwise, and that, when the spring is unwinding and the barrel is rotating, the cam 46 will be rotated in a clockwise direction.

With the form of spring which I have illustrated, it is possible to rotate the spring shaft in stressing the spring approximately fifty turns, and the ratio of the pinion 24 to the gear 25 is as one to two and one-half. Consequently, the ratchet 52 is provided with approximately one hundred teeth, so that the winding pinion may be rotated one hundred times before the cam 46 completes a single rotation. The cam is set in reference to the locking arm extension 47, when the spring is unwound, so that, when the spring shaft 19 has been rotated forty turns, the end of the arm will enter the recess in the cam and permit the latch 40, by its engagement with the stop 43, to prevent further winding of the spring, thereby preventing the over-winding of the spring, even though the spring then has a capacity for being additionally wound ten or more times. In this way, I prevent a matting or cramping of the spring. As soon as the winding ceases and the winding pinion has moved reversely to the limited extent heretofore described so as to cause the disengagement of the pawl 64 with the ratchet 52, any rotation of the barrel, which occurs thereafter during the unwinding of the spring, causes the rotation of the cam in a clockwise direction. This first results in disengaging the lock 40 from the stop 43 by the end of the arm 47 riding out upon the periphery of the cam.

Figures 2, 8:
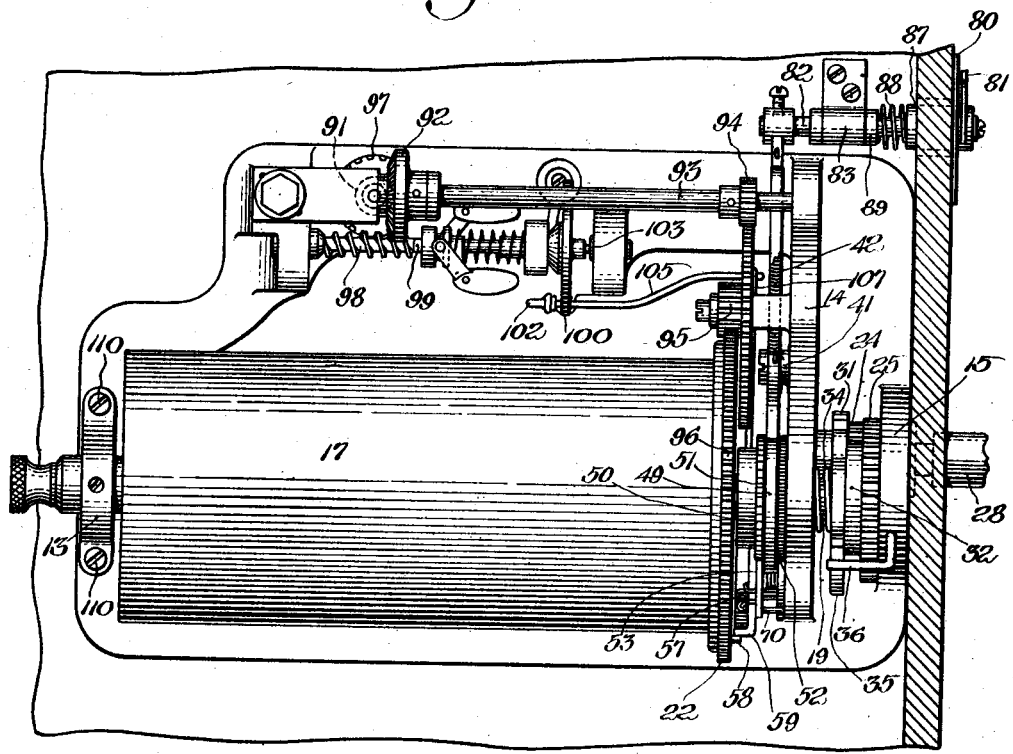
Fig. 2 represents an obverse plan view of the mechanism illustrated in Fig. 1.
Fig. 8 shows the lever which forms a part of the mechanism for preventing the unwinding of the spring during the rewinding.

It is, as I have previously stated, desirable to indicate in some manner the amount of power which is stored in the spring at any given time, so that the operator may know whether or not to rewind the spring before playing a record of given size. I employ an indicator which comprises a graduated scale 80 which is located outside of the side wall of the wooden casing, as shown in Fig. 2, and in connection with said scale I employ an index or pointer 81 which is secured upon a shaft 82 mounted in a bearing 83 and projecting through said side wall. The scale 80 is graduated in terms of a full record, and in Fig. 4 the scale has six graduations indicating the ability of the motor when fully wound to cause the playing of six full ten-inch records. On the inner end of the shaft 82 is secured an arm 84 which bears against an arm 85 projecting laterally from the hub of the latch 40; in fact, the latch 40 (and its extension 47) and the arm 85 constitute a two-armed lever pivoted intermediate the ends of the arm. The spring 42, to which reference has previously been made, is connected to the hub of said two-armed lever and to the end of the arm 84 so that it performs the function of causing the engagement of the arm 84 with the arm 85 and also of moving the latch to its active position when permitted by the cam 46. By forming the cam 46 with a spiral periphery 49 upon which the locking-arm extension 47 rests, it is quite apparent that, as the cam is rotated during the unwinding of the spring, the index 81 will be moved from the full-line position toward the dotted-line position in Fig. 4 so as to show or indicate the unexpended power still stored in the spring in terms of its capacity to play a given number of full ten-inch records. The index 81 itself is mounted upon a sleeve 87 which projects through the side wall of the casing and which is connected by a spring 88 with a collar 89 affixed to the shaft 82. In this way, the indicator is yieldingly connected with the shaft so that the foreign manipulation of the indicator 81 does not affect the operation of the locking latch 40.

In order to prevent an inaccurate indexing of the cam 46 during continued operations of winding and unwinding, it is necessary to stop the unwinding of the spring and the operation of the barrel during the rotation of the winding pinion. This may be accomplished in a variety of ways, but I preferably accomplish it by stopping the rotation of the governor since I thereby secure the greatest leverage upon the spring and am able to accomplish the stopping instantaneously. To describe this mechanism, it will be necessary to refer briefly to the remainder of the talking machine mechanism. This last-mentioned mechanism comprises a turn-table shaft 90 having a bevel gear 91 intermeshing with a complemental gear 92 on an intermediate shaft 93, the latter being provided with a pinion 94 driven through a train of reducing gears from the barrel gear 22. Said train of reducing gears comprises a pinion 95 engaging the barrel gear 22, and a gear 96 formed on or secured to the gear 95, and intermeshing with and driving the gear 94 on the shaft 93. The turn-table shaft 90 is provided with the usual worm wheel 97 intermeshing with and driving a worm 98 on the worm shaft 99 which is provided with the usual governor disk 100 which coöperates with the speed-controlling brake. For stopping the unwinding of the spring, I utilize a stopping mechanism which in the present case coöperates with the governor disk 100. This stopping mechanism consists of a two-armed lever pivoted intermediate its ends upon a screw pin 101 and having one arm 102 provided with a felt pad 103 to engage the face of the governor disk and stop its rotation. This arm 102 is normally held in an inactive positon by a spring 104. The other arm of said lever, which is indicated at 105, extends into a position where it may be engaged by an arm 107 formed on a hub 106 pivoted upon a screw pin 108, which extends into the inner end of the winding shaft, as shown in Figs. 3 and 8. The friction spring 71, which previously has been described, also bears against the hub 106 of the lever 107. When the winding shaft is being rotated, the lever 107 engages the arm 105 and rocking it about its pivot forces the arm 102 into contact with the governor disk so as to stop the rotation of the latter. When the winding ceases and the winding shaft moves reversely, due to the action of the recoil pawl 32, the lever 107 is moved frictionally in the opposite direction so as to permit the spring 104 to move the stopping arm 102 away from the governor disk and thus permit the motor to operate or unwind.

A mechanism, such as herein described, possesses numerous advantages additional to those which have been already stated. It is not necessary to refer in detail to those advantages, although I may advert to several of them. I may point out that, with the mechanism which I have illustrated, it is possible easily to remove the spring, its barrel and the spring shaft from the machine. This is secured by making the bracket 13 removable from the frame 12, as illustrated in Figs. 1 and 2. In this case, the upper end of the bracket is secured to the frame by screws 110 which may be easily removed. By removing the bracket and withdrawing the pin 26, by which the gear 25 is secured to the spring shaft 19, said spring shaft, spring and barrel may be moved axially to the left in Fig. 2 so as to disconnect them entirely from the machine, all without disturbing the controlling cam 46 and its associated mechanism. Again, by employing means for preventing the over-winding of the spring in connection with the winding shaft, I prevent injury to the operative gearing of the machine, said locking mechanism being separate from said gearing.

Of course it will be understood that the invention is not limited to the details of the mechanism which I have illustrated and herein described, because many changes may be made in the precise mechanism in which the invention is at present embodied without departing from the spirit and scope of the invention as expressed in the claims. In the present case, for example, I have illustrated a part of the locking mechanism by which I prevent over-winding of the spring for operating the index in order to save parts, but it will be apparent that the indicator might be controlled by the cam 46 through the intervention of other parts or might be controlled directly from the cam. Various other changes may be easily made which will suggest themselves to one becoming familiar with the invention as herein stated.

Having thus explained the nature of my said invention and described a way of making and using the same, although without attempting to set forth all of the forms in which it may be made or all of the modes of its use, what I claim is:

1. A spring motor comprising a spring, a spring shaft, a winding shaft, gearing connecting the winding shaft and the spring shaft, and mechanism controlled by the winding shaft and the spring for automatically locking the winding shaft against rotation when the spring has been stressed to a predetermined extent.

2. A spring motor comprising a spring, a spring shaft, a winding shaft, gearing connecting the winding shaft and the spring shaft, a stop on the winding shaft, mechanism including a latch for coacting with said stop and automatically locking said shaft against rotation when the spring has been stressed to a predetermined extent, and means for moving said latch into and out of engagement with said stop.

3. A spring motor comprising a barrel, a spring therein, a spring shaft having an end projecting from one end of the barrel, a winding shaft alongside said projecting end, a pair of gears directly connecting said shafts, and automatic mechanism controlled by both the spring and the winding shaft for locking one of said shafts when said spring has been stressed to a predetermined extent.

4. A spring motor comprising a spring, a member for stressing the spring, a lock for said member, and a cam which is actuated in stressing the spring for causing said lock automatically to stop further stressing of said spring.

5. A spring motor comprising a spring, a spring-winding shaft, a cam, mechanisms actuated alternately by the winding shaft and the spring for moving the cam, and a member controlled by said cam mechanically to stop said shaft from further stressing the spring.

6. A spring motor comprising a spring, a shaft for winding the spring, and mechanism for rendering said shaft inactive, including a rotatable controlling cam, a member operated thereby to stop the rotation of said shaft, and means actuated alternately by the spring and the shaft for oscillating said cam in opposite directions.

7. A spring motor comprising a spring, a winding shaft, and mechanism for preventing over-winding of the spring, said mechanism including a rotatable cam, automatic mechanism operated alternately by said spring and said shaft for oscillating said cam, and a cam-operated latch for locking the winding shaft against rotation.

8. A spring motor comprising a spring, an element for winding the spring and a spring-driven element, in combination with mechanism for preventing over-winding of said spring, said mechanism including a cam, means operated by the winding element for moving the cam in one direction, and means operated by the spring-driven element for moving the cam in the other direction.

9. A spring motor comprising a spring, an element for winding the spring and a spring-driven element, in combination with mechanism for preventing over-winding of said spring, said mechanism including a device for rendering the winding element inactive, a movable controller for said device, means actuated by the winding element for moving the controller in one direction, and means actuated by the spring-driven element for moving the controller in the opposite direction.

10. A spring motor comprising a spring, an element for winding the spring and a spring-driven element, in combination with mechanism controlled both by the spring-winding and spring-driven elements for preventing over-winding of said spring, said mechanism including a cam-operated member for rendering said element inactive, a cam, and pawl and ratchet mechanism actuated by the winding element for moving the cam.

11. A spring motor comprising a spring, an element for winding the spring, a spring-driven element, and mechanism for preventing the overwinding of said spring, said element comprising a device for rendering the winding element inactive, a movable controller for said device, pawl and ratchet mechanism operated by said driven element for moving said controller in one direction, and pawl and ratchet mechanism operated by said spring-winding element for moving said controller in the opposite direction.

12. A spring motor comprising a spring, an element for winding the spring, a spring-driven element, and mechanism for preventing the overwinding of said spring, said element comprising a device for rendering the winding element inactive, a movable controller for said device, pawl and ratchet mechanism operated by said driven element for moving said controller in one direction, pawl and ratchet mechanism operated by said spring-winding element for moving said controller in the opposite direction, and means for automatically throwing said pawls alternately out of action.

13. A spring motor comprising a spring, an element for winding the spring, a spring-driven element, and mechanism for preventing the overwinding of said spring, said element comprising a device for rendering the winding element inactive, a rotatable cam controlling said device, oppositely toothed ratchets rotatable with said cam, pawls associated with said ratchets and actuated respectively by said spring-winding element and said spring-driven element, and means for moving said pawls alternately into inactive position with reference to their respective ratchets.

14. A spring motor comprising a spring, an element for winding the spring, a spring-driven element, and mechanism for preventing the overwinding of said spring, said element comprising a device for rendering the winding element inactive, a rotatable cam controlling said device, oppositely toothed ratchets rotatable with said cam, pawls associated with said ratchets, movable carriers for said pawls, means actuated by said winding element for actuating one of said pawl cariers, and means actuated by the spring-driven element for actuating the other of said pawl carriers.

15. A spring motor comprising a spring, a rotatable spring-winding element, a ratchet thereon, a pivoted pawl for engaging said ratchet, and means permitting a limited yielding movement of said pawl on reverse rotation of said ratchet.

16. A spring motor comprising a spring, a rotatable spring-winding element, a ratchet thereon, a pivoted pawl for engaging said ratchet and having a longitudinal slot, a pivot member extending through said slot, and a spring bearing on the tail end of said pawl to permit a limited rearward movement of said pawl on reverse movement of said ratchet.

17. A spring motor comprising a spring, a rotatable spring-winding element, a ratchet thereon, a pivoted pawl for engaging said ratchet and having a longitudinal slot, a pivot member extending through said slot, a spring bearing on the tail end of said pawl to permit a limited rearward movement of said pawl on reverse movement of said ratchet, and means actuated by said winding element for moving said pawl about said pivot member out of disengagement with said ratchet when said element is being rotated to wind said spring.

18. A spring motor comprising a spring, a spring-driven element, a spring-winding element, and automatic mechanism holding said driven element against rotation only during the operation of the spring-winding element.

19. A spring motor comprising a spring, a spring-driven element, a spring-winding element, a member for holding said spring-winding element against rotation, and means actuated by said spring-winding element for moving said member into and out of active position.

20. A spring motor comprising a spring, a rotatable spring-driven element, a rotatable spring-winding element, a ratchet on said winding element, a yielding pawl associated with said ratchet and permitting a limited reverse rotation of said winding element, a movable member for holding said driven element against rotation, and a second member frictionally engaged with the winding element for moving said first-mentioned member into and out of active position, whereby said driven element is held against rotation during the rotation of said winding element to wind the spring.

21. A spring motor comprising a spring, a spring-driven element, an indicator, and a cam actuated by said spring-driven element for moving the indicator to show the power stored in the spring.

22. A spring motor comprising a spring, a spring-driven element, an element for winding the spring, and indicating mechanism for continuously indicating the power stored in the spring, comprising an indicator, a cam operated alternately by the spring and the winding element, and operative connections between the cam and the indicator.

23. A spring motor comprising a spring, a spring-driven element, an element for winding the spring, an indicator, a lever connected thereto, a cam engaged with said lever for actuating said indicator, and means automatically actuated by said winding element and said driven element respectively for moving said cam in opposite directions.

24. A spring motor for talking machines comprising a spring, indicating mechanism including a scale graduated in terms of records, and an index, said scale and pointer being movable one in relation to the other, and mechanism actuated automatically by said spring for actuating the movable member of the indicating mechanism, including a cam operatively connected with said index, and pawl and ratchet mechanisms actuated alternately to move said cam in opposite directions.

25. A spring motor for talking machines comprising a spring, indicating mechanism including a scale graduated in terms of records, and an index, said scale and pointer being movable one in relation to the other, a spring-driven element, a spring-winding element, pawl and ratchet mechanisms actuated respectively and alternately by said elements and a cam movable in opposite directions by said mechanisms for automatically actuating the movable member of the indicating mechanism.

26. The combination with winding means and a spring with which one end of the winding means coöperates, the other end of the spring being used for transmitting power, of a device for preventing overwinding of the spring, a pawl-and-ratchet mechanism connected with the transmitting end of said spring, to move said device in a direction to make it ineffective, and a pawl-and-ratchet mechanism connected with said winding means, for moving said device in a direction to make it effective.

27. The combination with a winding shaft and a spring to one end of which said shaft is connected, the other end of said spring being used for transmitting power, of a normally released stop for said winding shaft, a controller for said stop, and pawl-and-ratchet mechanism for enabling said controller to be moved in opposite directions by said winding shaft and said transmitting end; said controller being movable by said pawl-and-ratchet mechanism to a position to render said stop effective.

28. The combination with a winding shaft and a spring to one end of which said shaft is connected, the other end of said spring being used for transmitting power, of a normally released stop for said winding shaft, a controller for said stop, and pawl-and-ratchet mechanism for enabling said controller to be moved in opposite directions by said winding shaft and said transmitting end; said controller being movable by said pawl-and-ratchet mechanism to a position to render said stop effective, and said pawl-and-ratchet mechanism being effective upon the ensuing unwinding movement of the spring, to cause said controller to effect the release of said winding mechanism from the control of said stop.

29. The combination with winding means and a spring, one end of which is connected to said winding means and the other end of which is used to transmit power, of a reciprocatory index, a revoluble controller for said index, and a pawl-and-ratchet mechanism to enable said controller to be moved in opposite directions by said winding means and said transmitting end.

30. The combination with winding means and a spring, one end of which is connected to said winding means and the other end of which is used to transmit power, of a reciprocatory index, a revoluble controller for said index, and a pawl-and-ratchet mechanism to enable said controller to be moved in opposite directions by said winding means and said transmitting end, said controller having a cam, and said index having a follower to engage said cam.

In testimony whereof I have affixed my signature.

BERNARD S. NICKERSON.